US012749592B2

(12) United States Patent
Maruhashi et al.

(10) Patent No.: US 12,749,592 B2
(45) Date of Patent: Sep. 29, 2026

(54) INSULATED ELECTRICAL WIRE AND RESIN COMPOSITION

(71) Applicant: DAIKIN INDUSTRIES, LTD., Osaka (JP)

(72) Inventors: Takuma Maruhashi, Osaka (JP); Koji Nakanishi, Osaka (JP); Toyomitsu Seki, Osaka (JP); Hideki Kono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 440 days.

(21) Appl. No.: 18/191,341

(22) Filed: Mar. 28, 2023

(65) Prior Publication Data

US 2023/0260672 A1 Aug. 17, 2023

Related U.S. Application Data

(63) Continuation of application No. PCT/JP2021/035149, filed on Sep. 24, 2021.

(30) Foreign Application Priority Data

Sep. 30, 2020 (JP) ................................ 2020-165523

(51) Int. Cl.

*H01B 3/42* (2006.01)
*C08L 27/18* (2006.01)
*C08L 71/00* (2006.01)

(52) U.S. Cl.

CPC .............. *H01B 3/427* (2013.01); *C08L 27/18* (2013.01); *C08L 71/00* (2013.01); *C08L 2203/202* (2013.01); *C08L 2203/30* (2013.01)

(58) Field of Classification Search

CPC ........... C08L 2203/202; C08L 2203/30; C08L 27/18; C08L 71/00; C08L 71/10; C09D 127/18; C09D 171/10; H01B 3/307; H01B 3/427; H01B 3/445

See application file for complete search history.

(56) References Cited

U.S. PATENT DOCUMENTS 4,578,427 A 3/1986 Saito et al.
10,294,362 B2 * 5/2019 Ueda ........................ C08L 71/00
10,964,444 B2 * 3/2021 Ueda ........................ C08L 71/00
11,024,441 B2 * 6/2021 Masuda ............... C09D 171/00
12,448,514 B2 10/2025 Nakanishi et al.
2004/0253387 A1 12/2004 Cavero
2006/0110601 A1 5/2006 Hennessey
2014/0329087 A1 11/2014 Masuda et al.
2014/0329968 A1 11/2014 Masuda et al.
2015/0203712 A1 7/2015 Gopalakrishnan
2015/0259525 A1 9/2015 Mutsuda et al.
2015/0313959 A1 11/2015 Kissel et al.
2017/0301430 A1 10/2017 Iida et al.
2018/0001520 A1 1/2018 Saito et al.
2018/0354182 A1 12/2018 Miyake
2019/0127500 A1 5/2019 Liu et al.
2020/0123377 A1 4/2020 Nakanishi et al.
2020/0131385 A1 4/2020 Bartow et al.
2021/0130604 A1 5/2021 Ramakrishnan et al.
2022/0106475 A1 4/2022 Itami et al.
2023/0174780 A1 6/2023 Seki et al.
2023/0235182 A1 7/2023 Nakanishi et al.
2023/0242771 A1 8/2023 Nakanishi et al.

FOREIGN PATENT DOCUMENTS

CN 110225814 A 9/2019
CN 110799593 A 2/2020
CN 116057113 A 5/2023
EP 2 592 116 A1 5/2013
EP 2 881 430 A1 6/2015
EP 3 026 083 A1 6/2016
EP 3 950 825 A1 2/2022
JP 60-155275 A 8/1985
JP 63-286458 A 11/1988
JP 2006-527074 A 11/2006
JP 2016-79391 A 5/2016
JP 2017-217881 A 12/2017
JP 2018-2908 A 1/2018
JP 2019-48860 A 3/2019
JP 2019-511616 A 4/2019
JP 2020-526428 A 8/2020
WO 2004/108842 A1 12/2004
WO 2013/088968 A1 6/2013
WO 2014/034493 A1 3/2014

(Continued)

OTHER PUBLICATIONS

Extended European Search Report dated Sep. 24, 2024, issued in European Application No. 21875441.4.
Extended European Search Report dated Oct. 1, 2024, issued in European Application No. 21875444.8.
Extended European Search Report dated Nov. 14, 2024, issued in corresponding European Application No. 21875446.3.
International Preliminary Report on Patentability dated Mar. 28, 2023 with a Translation of the Written Opinion of the International Searching Authority in Application No. PCT/JP2021/035144.
International Preliminary Report on Patentability dated Mar. 28, 2023 with a Translation of the Written Opinion of the International Searching Authority in Application No. PCT/JP2021/035149.

(Continued)

*Primary Examiner* — Holly Rickman
*Assistant Examiner* — Linda N Chau
(74) *Attorney, Agent, or Firm* — Sughrue Mion, PLLC

(57) ABSTRACT

An insulated wire including a conductor (A) and an insulating layer (B) around the conductor (A). The insulating layer (B) contains an aromatic polyetherketone resin (I) and a fluorine-containing copolymer (II) and has a melt viscosity at 60 $sec^{-1}$ and 390° C. of 0.40 to 0.75 kPa·s. The aromatic polyetherketone resin (I) has a melt viscosity at 60 $sec^{-1}$ and 390° C. of 0.30 kPa·s or lower. The insulating layer (B) has a thickness of 30 to 300 μm.

9 Claims, No Drawings

(56) References Cited

FOREIGN PATENT DOCUMENTS

| | | | |
|---|---|---|---|
| WO | 2016/056431 | A1 | 4/2016 |
| WO | 2017/149896 | A1 | 9/2017 |
| WO | 2019/081143 | A1 | 5/2019 |
| WO | 2019/155977 | A1 | 8/2019 |
| WO | 2020/196243 | A1 | 10/2020 |

OTHER PUBLICATIONS

International Preliminary Report on Patentability dated Mar. 28, 2023 with a Translation of the Written Opinion of the International Searching Authority in Application No. PCT/JP2021/035153.

International Search Report dated Nov. 16, 2021 issued in Application No. PCT/JP2021/035149.

International Search Report dated Nov. 9, 2021 issued in Application No. PCT/JP2021/035153.

International Search Report dated Oct. 26, 2021 issued in Application No. PCT/JP2021/035144.

Hirokazu Komori et al., "Fluoropolymer PFA for powder bed fusion (under development)", Material Stage, vol. 20, No. 4, 2020, pp. 37-40 (7 pages total).

Non-Final Office Action issued Nov. 19, 2025 in corresponding U.S. Appl. No. 18/191,484.

Office Action dated Feb. 17, 2026, issued in related U.S. Appl. No. 18/191,519.

* cited by examiner

INSULATED ELECTRICAL WIRE AND RESIN COMPOSITION

CROSS REFERENCE TO RELATED APPLICATIONS

This application is a Rule 53(b) Continuation of International Application No. PCT/JP2021/035149 filed Sep. 24, 2021, claiming priority from Japanese Patent Application No. 2020-165523 filed Sep. 30, 2020, the respective disclosures of all of the above of which are incorporated herein by reference in their entirety.

TECHNICAL FIELD

The disclosure relates to insulated wires and resin compositions.

BACKGROUND ART

Electric wires used in automobiles and robots require excellent insulation. Recent trend acceleration towards higher voltages and higher currents demands electric wires including an insulating layer with a low permittivity in order to prevent deterioration of the insulating layer. Electric wires mounted in automobiles and the like further require high heat resistance.

Against such a background, various investigations have been made to improve electric wire properties. For example, an electric wire including an insulating layer formed using two or more resins has been proposed as described below.

Patent Literature 1 discloses an insulated wire including: a conductor (A); and an insulating layer (B) around the conductor (A), the insulating layer (B) being formed from a resin composition that contains an aromatic polyetherketone resin (I) and a fluororesin (II), the fluororesin (II) being a copolymer of tetrafluoroethylene and a perfluoroethylenic unsaturated compound represented by the following formula (1):

$$CF_2{=}CF{-}Rf^1 \quad (1)$$

wherein $Rf^1$ is $—CF_3$ or $—ORf^2$; and $Rf^2$ is a C1-C5 perfluoroalkyl group, the resin composition having a melt viscosity ratio (I)/(II) of the aromatic polyetherketone resin (I) to the fluororesin (II) of 0.3 to 5.0.

CITATION LIST

Patent Literature

Patent Literature 1: WO 2013/088968

SUMMARY

The disclosure relates to an insulated wire including: a conductor (A); and an insulating layer (B) around the conductor (A); the insulating layer (B) containing an aromatic polyetherketone resin (I) and a fluorine-containing copolymer (II) and having a melt viscosity at 60 $sec^{-1}$ and 390° C. of 0.40 to 0.75 kPa·s, the aromatic polyetherketone resin (I) having a melt viscosity at 60 $sec^{-1}$ and 390° C. of 0.30 kPa·s or lower, the insulating layer (B) having a thickness of 30 to 300 μm (hereinafter, referred to as the "insulated wire of the disclosure").

ADVANTAGEOUS EFFECTS

The insulated wire of the disclosure having the above structure has a high tensile elongation and includes a thin insulating layer. The resin composition of the disclosure having the above structure is excellent in processibility and tensile elongation.

DESCRIPTION OF EMBODIMENTS

An insulated wire including an insulating layer formed of an aromatic polyetherketone resin is excellent in strength and heat resistance but has poor flexibility to have low pliability. The permittivity of the insulating layer is not sufficient to meet the demands for higher voltages and higher currents. An insulated wire including an insulating layer formed of a fluororesin is excellent in flexibility and low permittivity but disadvantageously has poor strength and poor abrasion resistance.

The inventors conducted various studies in order to solve the above problems. The inventors have found that an insulated wire formed from a resin composition containing the aromatic polyetherketone resin (I) and the fluorine-containing copolymer (II) is excellent in strength, heat resistance, and low permittivity. The inventors have also found out that the melt viscosities of the insulating layer and the aromatic polyetherketone resin (I) within specific ranges surprisingly lead to production of an insulated wire that has a high tensile elongation resulting from the pliability and includes a thin insulating layer. The insulated wire of the disclosure was thus completed.

The insulated wire of the disclosure includes a conductor (A) and an insulating layer (B) around the conductor (A). The insulating layer (B) contains an aromatic polyetherketone resin (I) and a fluorine-containing copolymer (II) and has a melt viscosity at 60 $sec^{-1}$ and 390° C. of 0.40 to 0.75 kPa·s. The aromatic polyetherketone resin (I) has a melt viscosity at 60 $sec^{-1}$ and 390° C. of 0.30 kPa·s or lower. The insulating layer (B) has a thickness of 30 to 300 μm, preferably 30 to 160 μm.

The insulating layer (B) and aromatic polyetherketone resin (I) having the above structures can lead to formation of the insulating layer (B) excellent in moldability. Moreover, the insulated wire can include a thin insulating layer (B) to have a higher tensile elongation.

The insulating layer (B) contains the aromatic polyetherketone resin (I) and the fluorine-containing copolymer (II), and has a melt viscosity at 60 $sec^{-1}$ and 390° C. of 0.40 to 0.75 kPa·s. In order to obtain a thinner insulating layer (B) and a higher tensile elongation, the melt viscosity of the insulating layer (B) is preferably 0.50 kPa·s or higher, more preferably 0.55 kPa·s or higher, still more preferably 0.60 kPa·s or higher. The insulating layer having too low a melt viscosity may suffer molding defects such as pinholes when being made thinner. The melt viscosity is preferably 0.70 kPa·s or lower. The insulating layer (B) having too high a melt viscosity may not be formed thin. The melt viscosity of the insulating layer (B) is measured in conformity with ASTM D3835-02.

The aromatic polyetherketone resin (I) preferably has a melt viscosity of 0.30 kPa·s or lower at 60 $sec^{-1}$ and 390° C. A melt viscosity within this range can lead to improved processibility and allows the resulting insulating layer (B) to have a high tensile elongation. The upper limit of the melt viscosity is preferably 0.26 kPa·s, more preferably 0.20 kPa·s. The lower limit of the melt viscosity is 0.10 kPa·s, but is not limited thereto. A melt viscosity lower than 0.10 kPa·s may lead to poor moldability. An aromatic polyetherketone resin (I) having too high a melt viscosity cannot maintain the melt viscosity of the insulating layer (B) within a desired range, possibly failing to form a thin insulating layer (B).

The melt viscosity of the aromatic polyetherketone resin (I) is measured in conformity with ASTM D3835-02.

Combination of the melt viscosity of the insulating layer (B) and the melt viscosity of the resin (I) within the above specific ranges allows the insulated wire of the disclosure to have better moldability and a higher tensile elongation and include a thinner coating layer.

The insulating layer (B) in the insulated wire of the disclosure satisfies a ratio r2/r1 of 1.60 or lower, wherein r1 represents the average dispersed particle size of the fluorine-containing copolymer (II) and r2 represents the average dispersed particle size of the fluorine-containing copolymer (II) after melt flow rate measurement at 380° C. and a 5000-g load with 5-minute pre-heating in conformity with ASTM D1238. In order to provide a thinner insulating layer (B) and further improve the tensile elongation, the ratio r2/r1 is more preferably 1.50 or lower, still more preferably 1.47 or lower. The lower limit of the ratio r2/r1 ratio is not limited, but may be 0.80, 0.90, 1.00, 1.10, or 1.20.

In one embodiment of the disclosure, r1 and r2 of the fluorine-containing copolymer (II) satisfy r2≥r1.

Use of the aromatic polyetherketone resin (I) for the insulating layer (B) improves thin-wall processibility, resulting in the insulating layer (B) having a high tensile elongation.

The aromatic polyetherketone resin (I) may be any one containing a repeating unit containing an arylene group, an ether group (—O—), and a carbonyl group (—C(═O)—), and may contain, for example, any of the repeating units represented by the following formulas (a1) to (a5):

[—Ar—O—Ar—C(═O)—] (a1);

[—Ar—O—Ar—C(═O)—Ar—C(═O)—] (a2);

[—Ar—O—Ar—O—Ar—C(═O)—] (a3);

[—Ar—O—Ar—C(═O)—Ar—O—Ar—C(═O)—Ar—C(═O)—] (a4); and

[—Ar—O—Ar—O—Ar—C(═O)—Ar—C(═O)—] (a5), wherein Ar is a divalent aromatic hydrocarbon ring group optionally containing a substituent.

Examples of the divalent aromatic hydrocarbon ring group represented by Ar include: C6-C10 arylene groups such as phenylene groups, including an o-, m-, or p-phenylene group, and a naphthylene group; biarylene groups such as biphenylene groups, including a 2,2'-biphenylene group, a 3,3'-biphenylene group, and a 4,4'-biphenylene group, where each arylene group has a carbon number of 6 to 10; and terarylene groups such as an o-, m-, or p-terphenylene group, where each arylene group has a carbon number of 6 to 10. These aromatic hydrocarbon ring groups may have any substituent such as a halogen atom, an alkyl group, e.g., a linear or branched C1-C4 alkyl group such as a methyl group, a haloalkyl group, a hydroxy group, an alkoxy group, e.g., a linear or branched C1-C4 alkoxy group such as a methoxy group, a mercapto group, an alkylthio group, a carboxy group, a sulfo group, an amino group, a N-substituted amino group, or a cyano group. In the repeating units (a1) to (a5), Ar groups may be the same as or different from each other. Ar is preferably a phenylene group such as a p-phenylene group or a biphenylene group such as a 4,4'-biphenylene group.

An example of a resin containing the repeating unit (a1) is polyetherketone such as "PEEK-HT" available from Victrex. An example of a resin containing the repeating unit (a2) is polyetherketoneketone such as "PEKK" available from Arkema+Oxford Performance Materials. Examples of a resin containing the repeating unit (a3) include polyetheretherketone such as "VICTREX PEEK" available from Victrex, "Vestakeep®" available from Evonik, "Vestakeep-J" available from Daicel-Evonik, and "KetaSpire®" available from Solvay Specialty Polymers, and polyether-diphenyl-ether-phenyl-ketone-phenyl such as "Kadel®" available from Solvay Specialty Polymers. An example of a resin containing the repeating unit (a4) is polyetherketoneetherketoneketone such as "VICTREX ST" available from Victrex. An example of a resin containing the repeating unit (a5) is polyetheretherketoneketone. In the repeating unit containing an arylene group, an ether group, and a carbonyl group, the ratio (E/K) of an ether segment (E) to a ketone segment (K) may be, for example, 0.5 to 3, preferably about 0.5 to 2.0. The ether segment imparts flexibility to the molecule chain and the ketone segment imparts stiffness to the molecule chain. Thus, the larger the amount of the ether segment is, the higher the crystallization speed tends to be and the higher the crystallinity finally achieved tends to be, while the larger the amount of the ketone segment is, the higher the glass transition temperature tends to be and the higher the melting point tends to be. One of these aromatic polyetherketone resins (I) may be used alone or two or more thereof may be used in combination.

Preferred among these aromatic polyetherketone resins (I) are aromatic polyetherketone resins containing any of the repeating units (a1) to (a4). For example, the aromatic polyetherketone resin (I) preferably includes at least one resin selected from the group consisting of polyetherketone, polyetheretherketone, polyetherketoneketone, and polyetherketoneetherketoneketone, more preferably at least one resin selected from the group consisting of polyetherketone, polyetheretherketone, and polyetherketoneketone. In order to improve thin-wall processibility to increase the tensile elongation, polyetherketoneketone is particularly preferred.

The aromatic polyetherketone resin (I) preferably has a melting point of 300° C. or higher, more preferably 320° C. or higher. A melting point within this range allows the resulting molded article to have improved heat resistance. The melting point is preferably 380° C. or lower. An aromatic polyetherketone resin having a melting point equal to or higher than 380° C. may cause significant thermal degradation of the fluorine-containing copolymer during kneading, and thus, the physical properties may not be maintained. The melting point is the temperature corresponding to the maximum value on a heat-of-fusion curve with a temperature-increasing rate of 10° C./min using a differential scanning calorimeter (DSC).

The aromatic polyetherketone resin (I) preferably has a melt flow rate (MFR), which is measured at 380° C. and a 5000-g load, of 1 to 150 g/10 min, more preferably 5 to 130 g/10 min, still more preferably 10 to 100 g/10 min. A MFR within this range improves thin-wall processibility, allowing the resulting insulating layer (B) to have a high tensile elongation. The MFR of the aromatic polyetherketone resin (I) is measured using a melt indexer in conformity with ASTM D1238.

The aromatic polyetherketone resin (I) preferably has a glass transition temperature of 130° C. or higher, more preferably 135° C. or higher, still more preferably 140° C. or higher. A glass transition temperature within this range allows the resulting insulated wire to have excellent heat resistance. In terms of moldability, the upper limit of the glass transition temperature is preferably, but is not limited to, 220° C. or lower, more preferably 180° C. or lower.

The glass transition temperature is measured in conformity with JIS K7121 using a differential scanning calorimeter (DSC) at a temperature-increasing rate of 20° C./min.

In the insulating layer (B), the fluorine-containing copolymer (II) is, for example, a polymer containing at least one polymerized unit based on a fluorine-containing ethylenic monomer. The fluorine-containing copolymer (II) is preferably a melt-fabricable fluororesin. One fluorine-containing copolymer (II) may be used or two or more fluorine-containing copolymers (II) may be used.

Examples of the fluorine-containing copolymer (II) include a tetrafluoroethylene (TFE)/hexafluoropropylene (HFP) copolymer, a TFE/HFP/perfluoro(alkyl vinyl ether) (PAVE) copolymer, a TFE/PAVE copolymer (PFA), an ethylene (Et)/TFE copolymer, an Et/TFE/HFP copolymer, a chlorotrifluoroethylene (CTFE)/TFE copolymer, a CTFE/TFE/PAVE copolymer, an Et/CTFE copolymer, a TFE/vinylidene fluoride (VdF) copolymer, a VdF/HFP/TFE copolymer, and a VdF/HFP copolymer.

The PAVE preferably contains a C1-C6 alkyl group, and examples thereof include perfluoro(methyl vinyl ether), perfluoro(ethyl vinyl ether), perfluoro(propyl vinyl ether), and perfluoro(butyl vinyl ether).

The fluorine-containing copolymer (II) is more preferably a copolymer of tetrafluoroethylene (TFE) and a perfluoroethylenic unsaturated compound represented by the following formula (1):

$$CF_2{=}CF{-}Rf^1 \quad (1)$$

wherein $Rf^1$ is $-CF_3$ or $-ORf^2$, where $Rf^2$ is a C1-C5 perfluoroalkyl group. When $Rf^1$ is $-ORf^2$, $Rf^2$ is preferably a C1-C3 perfluoroalkyl group. Use of the fluorine-containing copolymer (II) can improve thin-wall processibility, allowing the resulting insulating layer (B) to have a high tensile elongation.

In order to improve thin-wall processibility to provide an insulating layer (B) having a high tensile elongation, the perfluoroethylenic unsaturated compound represented by the formula (1) preferably includes at least one selected from the group consisting of hexafluoropropylene (HFP), perfluoro (methyl vinyl ether) (PMVE), perfluoro(ethyl vinyl ether) (PEVE), and perfluoro(propyl vinyl ether) (PPVE), more preferably at least one selected from the group consisting of hexafluoropropylene and perfluoro(propyl vinyl ether).

The fluorine-containing copolymer (II) preferably includes at least one selected from the group consisting of a TFE/HFP copolymer, a TFE/HFP/PPVE copolymer, and a TFE/PPVE copolymer, more preferably at least one selected from the group consisting of a TFE/HFP copolymer and a TFE/HFP/PPVE copolymer.

The fluorine-containing copolymer (II) preferably contains 98 to 75% by mass of a polymerized unit based on TFE (TFE unit) and 2 to 25% by mass of a polymerized unit based on a perfluoroethylenic unsaturated compound represented by the formula (1) relative to all polymerized units. The lower limit of the amount of TFE defining the fluorine-containing copolymer (II) is more preferably 77% by mass, still more preferably 80% by mass, particularly preferably 83% by mass, more particularly preferably 85% by mass. The upper limit of the amount of TFE defining the fluorine-containing copolymer (II) is more preferably 97% by mass, still more preferably 95% by mass, particularly preferably 92% by mass.

The lower limit of the amount of the perfluoroethylenic unsaturated compound represented by the formula (1) defining the fluorine-containing copolymer (II) is more preferably 3% by mass, still more preferably 5% by mass. The upper limit of the amount of the perfluoroethylenic unsaturated compound represented by the formula (1) defining the fluorine-containing copolymer (II) is more preferably 23% by mass, still more preferably 20% by mass, particularly preferably 17% by mass, more particularly preferably 15% by mass.

The fluorine-containing copolymer (II) is preferably a copolymer consisting of TFE and a perfluoroethylenic compound represented by the formula (1).

The fluorine-containing copolymer (II) preferably has a melt viscosity of 0.2 to 4.0 kPa·s at 60 $sec^{-1}$ and 390° C. A melt viscosity within this range can improve thin-wall processibility, allowing the resulting insulating layer (B) to have a high tensile elongation.

The lower limit of the melt viscosity is more preferably 0.25 kPa·s, still more preferably 0.3 kPa·s, particularly preferably 0.35 kPa·s, most preferably 0.4 kPa·s. The upper limit of the melt viscosity is more preferably 3.7 kPa·s, still more preferably 3.6 kPa·s, particularly preferably 3.5 kPa·s.

The melt viscosity of the fluorine-containing copolymer (II) is measured in conformity with ASTM D3835-02.

The fluorine-containing copolymer (II) preferably has a melt flow rate (MFR), which is measured at 380° C. and a 5000-g load, of 0.1 to 100 g/10 min, more preferably 0.5 to 80 g/10 min, still more preferably 0.5 to 70 g/10 min, particularly preferably 10 to 60 g/10 min. An MFR within this range can improve thin-wall processibility, allowing the resulting insulating layer (B) to have a high tensile elongation. The MFR of the fluorine-containing copolymer (II) is measured using a melt indexer in conformity with ASTM D1238.

The melting point of the fluorine-containing copolymer (II) is preferably, but is not limited to, equal to or lower than the melting point of the aromatic polyetherketone resin (I) because the fluorine-containing copolymer (II) has preferably already been in a molten state at a temperature where the aromatic polyetherketone resin (I) used in the molding melts. For example, the melting point of the fluorine-containing copolymer (II) is preferably 200° C. to 323° C., more preferably 220° C. to 320° C., still more preferably 240° C. to 315° C. The melting point is the temperature corresponding to the maximum value on a heat-of-fusion curve with a temperature-increasing rate of 10° C./min using a differential scanning calorimeter (DSC).

The fluorine-containing copolymer (II) may be treated with fluorine gas or ammonia by a known method in advance.

In order to reduce agglomeration and coalescence of the fluorine-containing copolymer phase and to easily control the rate of change of the dispersed particle size within a desired range in the insulating layer (B), a fluorine-containing copolymer containing a reactive functional group may be used. Specific examples of the reactive functional group include, but are not limited to, a vinyl group, an epoxy group, a carboxy group, an acid anhydride group, an ester group, an aldehyde group, a carbonyldioxy group, a haloformyl group, an alkoxycarbonyl group, an amino group, a hydroxy group, a styryl group, a methacrylic group, an acrylic group, a ureido group, a mercapto group, a sulfide group, an isocyanate group, and a hydrolyzable silyl group. Preferred among these is at least one selected from the group consisting of an epoxy group, a carboxy group, an acid anhydride group, an amino group, and a hydroxy group, more preferred is at least one selected from the group consisting of a carboxy group and an acid anhydride group. The fluorine-containing copolymer may contain two or more of these reactive functional groups. The reactive functional group(s) may be introduced into either a main chain end or a side chain of the fluorine-containing copolymer.

The functional group content in the fluorine-containing copolymer containing a reactive functional group is preferably, but is not limited to, within a range from 0.01 mol % to 15 mol % in consideration of sufficient progress of the reaction and deterioration of the fluidity.

In the insulating layer (B), the fluorine-containing copolymer (II) preferably defines a dispersed phase at an average dispersed particle size of 5.0 μm or smaller. An average dispersed particle size within this range can improve thin-wall processibility, allowing the resulting insulating layer (B) to have a higher tensile elongation. In order to provide an insulating layer (B) having much better properties and to achieve much better moldability, the average dispersed particle size is preferably 4.0 μm or smaller, more preferably 3.0 μm or smaller, still more preferably 2.5 μm or smaller, particularly preferably 2.0 μm or smaller, most preferably 1.5 μm or smaller. The lower limit of the average dispersed particle sizes may be, but is not limited to, 0.01 μm.

The average dispersed particle size of the fluorine-containing copolymer (II) in the insulating layer (B) is determined by the following procedure. In determination of the average dispersed particle size, the insulating layer (B) is cut in the direction perpendicular to the longitudinal direction of the insulating layer (B) to obtain a test piece, and the cross section of the test piece is observed using a confocal laser microscope. The resulting micrograph is analyzed using image analysis software (Image J). The dispersed phases are selected and the equivalent circle diameters are measured. The equivalent circle diameters of 20 dispersed phases are calculated and averaged to determine the average dispersed particle size.

In the insulating layer (B), the mass ratio (I):(II) between the aromatic polyetherketone resin (I) and the fluorine-containing copolymer (II) is preferably, but is not limited to, 99:1 to 30:70, for example. The mass ratio is more preferably 95:5 to 35:65, still more preferably 95:5 to 40:60.

The insulating layer (B) preferably has a relative permittivity of 2.80 or lower, more preferably 2.70 or lower, still more preferably 2.60 or lower. A relative permittivity lower than this range allows the insulating layer (B) to be suitably used as a wrapping electric wire coating material or a film for a flexible printed circuit board. Since the insulating layer (B) requires high insulating properties, the lower the relative permittivity, the better. Still, the relative permittivity is preferably 2.10 or higher. In the case where the proportion of the fluorine-containing copolymer is high such that the relative permittivity is approximately lower than 2.10, the resulting mechanical properties are significantly poor and desired mechanical properties are possibly difficult to achieve. The relative permittivity is a value measured by a cavity resonator perturbation method.

The insulating layer (B) may further contain an optional component other than the aromatic polyetherketone resin (I) and the fluorine-containing copolymer (II). Examples of the optional component other than the aromatic polyetherketone resin (I) and the fluorine-containing copolymer (II) include, but are not limited to, fibrous reinforcements such as whiskers of, e.g., potassium titanate, glass fiber, asbestos fiber, carbon fiber, ceramic fiber, potassium titanate fiber, aramid fiber, and other high-strength fibers; inorganic fillers such as talc, mica, clay, carbon powder, graphite, artificial graphite, natural graphite, and glass beads; colorants; commonly used inorganic or organic fillers such as flame retarders; lubricants such as silicone oil and molybdenum disulfide; pigments; conducting agents such as carbon black; impact resistance improvers such as rubber; glidants such as magnesium stearate; ultraviolet absorbers such as benzotriazole compounds; foaming agents such as boron nitride; and other additives.

These additives in amounts that do not impair the effects of the disclosure may be added to the aromatic polyetherketone resin (I) that serves as a material or to the fluorine-containing copolymer (II) that serves as a material. Also, these additives in amounts that do not impair the effects of the disclosure may be added to the materials in a molten state in, for example, a side feeding manner upon kneading of the aromatic polyetherketone resin (I) and the fluorine-containing copolymer (II).

(III) Fibrous Filler

Preferably, the insulating layer (B) further contains a fibrous filler (III). Examples of the fibrous filler used in the insulating layer (B) include fibrous inorganic fillers such as glass fiber, carbon fiber, carbon milled fiber, metal fiber, asbestos fiber, rock wool, ceramic fiber, slag fiber, potassium titanate whisker, boron whisker, aluminum borate whisker, calcium carbonate whisker, titanium oxide whisker, wollastonite, xonotlite, palygorskite (attapulgite), and sepiolite; heat-resistant fibrous organic fillers typified by heat-resistant organic fibers, such as aramid fiber, polyimide fiber, and polybenzothiazole fiber; and fibrous fillers prepared by coating the surfaces of these fillers with a different material such as a metal or a metal oxide. Examples of the fillers prepared by coating the surfaces of the listed fillers with a different material include metal-coated glass fiber and metal-coated carbon fiber. Examples of methods for coating the surfaces with a different material include, but are not limited to, known plating processes such as electrolytic plating, electroless plating, and melt plating; vacuum deposition; ion plating; CVD processes such as thermal CVD, MOCVD, and plasma CVD; a PVD process; and sputtering. Preferred among these fibrous fillers is at least one selected from the group consisting of glass fiber, carbon fiber, carbon milled fiber, and aramid fiber, more preferred is at least one selected from the group consisting of glass fiber and carbon fiber.

The fibrous filler preferably has a fiber diameter ranging from 0.1 to 20 μm. The upper limit of the fiber diameter is more preferably 18 μm, still more preferably 15 μm. The lower limit of the fiber diameter is more preferably 1 μm, still more preferably 6 μm. The fiber diameter refers to the number average fiber diameter. The number average fiber diameter is a value calculated from scanning electron microscopic images of residues collected after the molded article is dissolved in a solvent or after the resin is decomposed with a basic compound and ash residues collected after the molded article is burned into ashes in a crucible.

In the case where the fibrous filler used in the insulating layer (B) is glass fiber, the glass fiber may have any of a variety of glass compositions such as compositions of A-glass, C-glass, and E-glass. Such glass filler may optionally contain components such as $TiO_2$, $SO_3$, and $P_2O_5$. More preferred among these is E-glass (alkali-free glass). The glass fiber is preferably surface-treated with a known surface-treating agent such as a silane coupling agent, a titanate coupling agent, or an aluminate coupling agent in order to achieve improved mechanical strength. Also, the glass fiber is preferably bundled with a resin such as an olefinic resin, a styrenic resin, an acrylic resin, a polyester resin, an epoxy resin, or a urethane resin, particularly preferably with an epoxy resin or a urethane resin in order to achieve increased mechanical strength. The amount of a sizing agent attached to the bundled glass fiber is preferably 0.1 to 3% by mass, more preferably 0.2 to 1% by mass in 100% by mass of the glass fiber. The fibrous filler used in the insulating layer (B) may be glass fiber having a flat cross section. For the glass fiber having a flat cross section, the fiber cross section preferably has an average major axis of 10 to 50 μm, more preferably 15 to 40 μm, still more preferably 20 to 35 μm, and preferably has an average ratio of the major axis to the minor axis (major axis/minor axis) of 1.5 to 8, more preferably 2 to 6, still more preferably 2.5 to 5. Use of a glass fiber having a flat cross section with an average ratio of the major axis to the minor axis falling within this range leads to greater improvement in anisotropy than use of fiber having a non-circular cross section with an average ratio of lower than 1.5. Examples of the shape of the flat cross section include not only a flat shape but also an elliptical shape, an eye-brow shape, a trefoil shape, and a non-circular shape similar to any of these shapes. In order to improve mechanical strength and low anisotropy, a flat shape is preferred among these. The glass fiber having a flat cross section preferably has a ratio between the average fiber length and the average fiber diameter (aspect ratio) of 2 to 120, more preferably 2.5 to 70, still more preferably 3 to 50. A ratio between the fiber length and the average fiber diameter of lower than 2 may cause a poor effect of improving the mechanical strength. A ratio between the fiber length and the average fiber diameter of higher than 120 may cause a high anisotropy and poor appearance of the insulating layer (B). The average fiber diameter of the glass fiber having a flat cross section refers to the number average fiber diameter obtained when the flat cross-sectional shape is converted into a true circular shape having the same area as the flat cross-sectional shape. The average fiber length refers to the number average fiber length of the fiber in the insulating layer (B). The number average fiber length is a value calculated using an image analyzer from optical microscopic images of filler residues collected after the insulating layer (B) is subjected to treatment such as asking at high temperature, dissolution in a solvent, or decomposition with a chemical. The value is calculated without counting the fibers having a length not longer than the fiber diameter.

The fibrous filler (III) is preferably present in a mass proportion of 0 to 50% by mass, more preferably 5 to 40% by mass, still more preferably 10 to 30% by mass relative to the insulating layer (B).

Other Additives

In order to improve the design, for example, of the insulating layer (B), any of additives are advantageously used. These additives are described in detail below.

(IV) Dye and Pigment

The insulating layer (B) may further contain any of a variety of dyes and pigments to provide a molded article exhibiting any of a variety of design. Examples of dyes and pigments to be used in the insulating layer (B) include perylene-based dyes, coumarin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes, and phthalocyanine-based dyes. The insulating layer (B) may further contain a metallic pigment to achieve better metallic color. A preferred metallic pigment is aluminum powder. Mixing a fluorescent brightener or a different light-emitting fluorescent dye can provide a better design effect utilizing the luminescent color.

(V) Heat-Absorptive Compound

The insulating layer (B) may contain a heat-absorptive compound. Preferred examples of this compound include various metal compounds having an excellent near-infrared light absorbing ability such as a phthalocyanine-based near-infrared absorber, a metal oxide-based near-infrared absorber, e.g., ATO, ITO, iridium oxide, ruthenium oxide, imonium oxide, and titanium oxide, and a metal boride-based or tungsten oxide-based near-infrared absorber such as lanthanum boride, cerium boride, and tungsten boride; and carbon filler. An example of the phthalocyanine-based near-infrared absorber is MIR-362, which is commercially available from Mitsui Chemicals, Inc. and is easily available. Examples of the carbon filler include carbon black, graphite (including both natural and artificial), and fullerene. Preferred are carbon black and graphite. One of these may be used alone or two or more thereof may be used in combination. The phthalocyanine-based near-infrared absorber is preferably contained in an amount of 0.0005 to 0.2 parts by mass, more preferably 0.0008 to 0.1 parts by mass, still more preferably 0.001 to 0.07 parts by mass relative to 100 parts by mass of the insulating layer (B). The metal oxide-based near-infrared absorber, metal boride-based near-infrared absorber, and carbon filler are each preferably contained in an amount within a range from 0.1 to 200 ppm (proportion by mass), more preferably 0.5 to 100 ppm, in the insulating layer (B).

(VI) Highly Light-Reflective White Pigment

The insulating layer (B) may contain a highly light-reflective white pigment to achieve a light-reflecting effect. The white pigment is particularly preferably a titanium dioxide pigment, especially titanium dioxide treated with an organic surface-treating agent such as silicone. The highly light-reflective white pigment is preferably contained in an amount of 3 to 30 parts by mass, more preferably 8 to 25 parts by mass, relative to 100 parts by mass of the resin composition. Two or more highly light-reflective white pigments may be used in combination.

(VII) Ultraviolet Absorber

The insulating layer (B) may contain an ultraviolet absorber to achieve weather resistance. Specific examples of the ultraviolet absorber include benzophenone-based ultraviolet absorbers such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone. Specific examples of the ultraviolet absorber include benzotriazole-based ultraviolet absorbers such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), and 2-[2-hydroxy-3-(3,4,5,6-tetrahydrophthalimidomethyl)-5-methylphenyl]benzotriazole, and polymers having a 2-hydroxyphenyl-2H-benzotriazole skeleton such as a copolymer of 2-(2'- hydroxy-5-methacryloxyethylphenyl)-2H-benzotriazole and a vinyl monomer copolymerizable with the former monomer and a copolymer of 2-(2'-hydroxy-5-acryloxyethylphenyl)-2H-benzotriazole and a vinyl monomer copolymerizable with the former monomer. Specific examples of the ultraviolet absorber include hydroxyphenyltriazine-based ultraviolet absorbers such as 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Examples thereof also include compounds obtainable by replacing the phenyl group in any of the aforementioned compounds by a 2,4-dimethylphenyl group, such as 2-(4,6-bis(2,4-dimethylphenyl)-1,3,5-triazin-2-yl)-5-hexyloxyphenol. Specific examples of the ultraviolet absorber include cyclic imino ester-based ultraviolet absorbers such as 2,2'-p-phenylenebis(3,1-benzoxazin-4-one), 2,2'-m-phenylenebis(3,1-benzoxazin-4-one), and 2,2'-p,p'-diphenylenebis(3,1-benzoxazin-4-one). Specific examples of the ultraviolet absorber also include cyanoacrylate-based ultraviolet absorbers such as 1,3-bis-[(2'-cyano-3',3'-diphenylacryloyl)oxy]-2,2-bis[(2-cyano-3,3-diphenylacryloyl)oxy] methyl)propane and 1,3-bis-[(2-cyano-3,3-diphenylacryloyl)oxy]benzene. The ultraviolet absorber may be a polymer-form ultraviolet absorber that is in the form of a copolymer of an ultraviolet absorptive monomer and/or a light-stable monomer with a monomer such as an alkyl (meth)acrylate as a result of having a structure of a radically polymerizable monomer compound. Preferred examples of the ultraviolet absorptive monomer include compounds containing a benzotriazole skeleton, a benzophenone skeleton, a triazine skeleton, a cyclic imino ester skeleton, or a cyanoacrylate skeleton in an ester substituent of a (meth)acrylic acid ester. In view of the ultraviolet absorbing ability, preferred among these are benzotriazole-based ultraviolet absorbers and hydroxyphenyltriazine-based ultraviolet absorbers. In view of the heat resistance and hue, preferred are cyclic imino ester-based ultraviolet absorbers and cyanoacrylate-based ultraviolet absorbers. Specific examples thereof include “Kemisorb 79” available from Chemipro Kasei Kaisha, Ltd. and “Tinuvin 234” available from BASF Japan Ltd. One of these ultraviolet absorbers may be used alone or two or more thereof may be used in the form of a mixture.

The ultraviolet absorber is preferably contained in an amount of 0.01 to 3 parts by mass, more preferably 0.01 to 1 part by mass, still more preferably 0.05 to 1 part by mass, particularly preferably 0.05 to 0.5 parts by mass, relative to 100 parts by mass of the insulating layer (B).

(VIII) Antistatic Agent

The insulating layer (B) may be required to have antistatic performance in some cases. In such cases, the insulating layer (B) preferably contains an antistatic agent. Examples of the antistatic agent include (1) phosphonium organosulfonates such as phosphonium arylsulfonates, typified by phosphonium dodecylbenzenesulfonate, and phosphonium alkylsulfonates; and phosphonium borates such as phosphonium tetrafluoroborate. The phosphonium salt is appropriately contained in an amount of 5 parts by mass or less, preferably ranging from 0.05 to 5 parts by mass, more preferably from 1 to 3.5 parts by mass, still more preferably from 1.5 to 3 parts by mass, relative to 100 parts by mass of the insulating layer (B). Examples of the antistatic agent include (2) organosulfonic acid alkali (alkaline earth) metal salts such as lithium organosulfonates, sodium organosulfonates, potassium organosulfonates, cesium organosulfonates, rubidium organosulfonates, calcium organosulfonates, magnesium organosulfonates, and barium organosulfonates. These metal salts can also be used as flame retarders, as described above. Specific examples of the metal salts include metal salts of dodecylbenzenesulfonic acid and metal salts of perfluoroalkanesulfonic acids. The organosulfonic acid alkali (alkaline earth) metal salt is appropriately contained in an amount of 0.5 parts by mass or less, preferably 0.001 to 0.3 parts by mass, more preferably 0.005 to 0.2 parts by mass, relative to 100 parts by mass of the insulating layer (B). Particularly preferred are salts of alkali metals such as potassium, cesium, and rubidium.

Examples of the antistatic agent include (3) ammonium organosulfonates such as ammonium alkylsulfonates and ammonium arylsulfonates. The ammonium salt is appropriately contained in an amount of 0.05 parts by mass or less relative to 100 parts by mass of the insulating layer (B). Examples of the antistatic agent include (4) polymers containing a poly(oxyalkylene) glycol component as a constituent, such as polyether ester amide. The polymer is appropriately contained in an amount of 5 parts by mass or less relative to 100 parts by mass of the insulating layer (B).

(IX) Filler

The insulating layer (B) may contain any of a variety of known fillers as reinforcing filler other than fibrous fillers. Examples of such fillers include a variety of platy filler and powdery filler. The platy filler means filler in the form of plates, including those having a rough surface and those having a curved portion. The powdery filler means filler having a shape other than these shapes, including filler having an indefinite shape.

Preferred examples of the platy filler include glass flakes, talc, mica, kaolin, metal flakes, carbon flakes, and graphite, and platy filler prepared by coating the surface of any of these fillers with a different material such as a metal or a metal oxide. The particle size thereof preferably ranges from 0.1 to 300 μm. For filler having a particle size within a range up to about 10 μm, the particle size corresponds to the median size (D50) in the particle size distribution determined by X-ray transmission, which is one of liquid sedimentation techniques. For filler having a particle size within a range of 10 to 50 μm, the particle size corresponds to the median size (D50) in the particle size distribution determined by laser diffraction/scattering. For filler having a particle size within a range of 50 to 300 μm, the particle size corresponds to the particle size determined by vibration sieving. The particle size is a value in the resin composition. The platy filler may be surface-treated with any of a variety of coupling agents such as silane coupling agents, titanate coupling agents, aluminate coupling agents, and zirconate coupling agents. Alternatively, the platy filler may be a granulated product prepared by bundling the platy filler with any of a variety of resins such as olefinic resin, styrenic resin, acrylic resin, polyester resin, epoxy resin, and urethane resin or a higher fatty acid ester or by compressing the platy filler.

(X) Different Resin and/or Elastomer

The insulating layer (B) may contain a small proportion of a different resin and/or elastomer instead of a portion of the resin component to the extent that the effects of the disclosure are not impaired and can be achieved. The different resin and/or elastomer is preferably contained in an amount of 20 parts by mass or less, more preferably 10 parts by mass or less, still more preferably 5 parts by mass or less, most preferably 3 parts by mass or less, relative to 100 parts by mass of the insulating layer (B). Examples of the different resin include resins such as polyester resins, including polyethylene terephthalate and polybutylene terephthalate, polyamide resin, polyimide resin, polyetherimide resin, polyurethane resin, silicone resin, polyphenylene ether resin, polyphenylene sulfide resin, polysulfone resin, polymethacrylate resin, phenol resin, and epoxy resin. Examples of the different elastomer include isobutylene-isoprene rubber, styrene-butadiene rubber, ethylene-propylene rubber, acrylic elastomers, polyester elastomers, polyamide elastomers, and core-shell elastomers such as methyl methacrylate-styrene-butadiene (MBS) rubber, methyl methacrylate-butadiene (MB) rubber, and methyl methacrylate-acrylonitrile-styrene (MAS) rubber, fluororubber, and a fluorine-containing elastomer.

(XI) Other Additives

The insulating layer (B) may contain any of additives such as a fluidity improver, an antibacterial agent, a dispersant such as a liquid paraffin, a light-catalytic soil resistant agent, and a photochromic agent.

In the insulating layer (B), the sum of the aromatic polyetherketone resin (I) and the fluorine-containing copolymer (II) is preferably 100 to 50% by mass. Less than 50% by mass in total of these components may cause a failure in providing a desired tensile elongation.

The insulating layer (B) has a thickness of 30 to 300 μm. In order to reduce the size of the device for installing wires, the thickness is preferably smaller. Specifically, the insulating layer (B) preferably has a thickness of 250 μm or smaller, more preferably 150 μm or smaller, still more preferably 100 μm or smaller. In order to ensure insulation properties, the insulating layer (B) preferably has a thickness of 35 μm or greater, more preferably 40 μm or greater. The insulating layer (B) having too small a thickness may lose its insulating properties and suffer molding defects such as pinholes. The insulated wire of the disclosure can have a high tensile elongation despite the small thickness of the insulating layer (B).

The insulating layer (B) is formed around the conductor (A). The insulated wire of the disclosure may be a wire in which the conductor (A) and the insulating layer (B) are in direct contact or a multilayer wire in which one or more different resin layers are provided between the conductor (A) and the insulating layer (B). The insulated wire of the disclosure may be a multilayer wire further including one or more different resin layers around the insulating layer (B).

The different resin layers preferably contain at least one resin selected from the group consisting of aromatic polyetherketone resin, fluororesin, polyamideimide, polyetherimide, polyethersulfone, polyphenylene sulfide, polyphenylenesulfone, polyarylate, liquid crystal polymers, polyamide, polyacetal, polycarbonate, polyester, polystyrene, polyphenylene ether, polyvinyl chloride, polyethylene, polypropylene, polystyrene, ABS (acrylonitrile/butadiene/styrene) resin, AS (acrylonitrile/styrene) resin, acrylic resin, phenolic resin, epoxy resin, unsaturated polyester, silicone resin, polyurethane, urea resin, and melamine resin.

The multilayer wire can be easily produced by extrusion molding resins or resin compositions constituting the layers onto a conductor by a conventionally known method such as tandem extrusion or a molding method using a multilayer die.

The conductor (A) may be formed of any material having good conductivity. Examples of the material include copper, copper alloys, copper-clad aluminum, aluminum, silver, gold, galvanized iron, and carbon. The conductor (A) may have any shape such as a circular shape or a flat shape. The conductor (A) may be formed of copper plated with nickel or silver.

The insulating layer (B) used in the insulated wire of the disclosure may include a foam insulating layer. The foam insulating layer may have any thickness. The foam insulating layer may be composed of one layer or multiple layers including two or more layers.

The insulated wire of the present disclosure preferably has a tensile elongation of 100% or higher, more preferably 150% or higher, still more preferably 170% or higher. The higher the tensile elongation, the better, and the upper limit is not limited but may be 300%.

The insulated wire of the disclosure is suitably used for, for example, aerospace wires, underground power cables, submarine power cables, high-voltage cables, superconducting cables, wrapping wires, wires for automobiles, wire harnesses/electrical components, wires for robots/FA, wires for OA equipment, wires for information equipment (optical fiber cables, LAN cables, HDMI® cables, lightning cables, audio cables, etc.), internal wiring for communication base stations, large current internal wiring (inverters, power conditioners, storage battery systems, etc.), internal wiring for electronic equipment, small electronic equipment/mobile wiring, wiring for moving parts, internal wiring for electrical equipment, internal wiring for measuring equipment, power cables (for construction, wind/solar power generation, etc.), and cables for control/instrumentation wiring. The insulated wire of the disclosure can be also suitably used as a coil winding (magnet wire). The insulated wire of the disclosure is less likely to be damaged during winding processing. The winding is suitable for motors, rotating electrical machines, compressors, transformers, etc., and is sufficiently applicable to use in downsized and/or high-output motors which require high voltage, high current, and high thermal conductivity and therefore require high-density winding processing. The insulated wire is also suitable as a wire for power distribution, power transmission, or communication.

The insulated wire of the disclosure can be produced by a production method including a step of preparing a resin composition containing the aromatic polyetherketone resin (I) and the fluorine-containing copolymer (II), and a molding step of molding the resin composition into an insulating layer (B) around a conductor (A).

An example of a method for producing the resin composition is a method in which the aromatic polyetherketone resin (I) and the fluorine-containing copolymer (II) are put into a mixer at an appropriate ratio, optionally together with any of the aforementioned different components, and the components are melt-kneaded at a temperature not lower than the melting points of the aromatic polyetherketone resin (I) and the fluorine-containing copolymer (II).

The different component(s) may be added to and mixed with the aromatic polyetherketone resin (I) and the fluorine-containing copolymer (II) in advance, or may be added when the aromatic polyetherketone resin (I) and the fluorine-containing copolymer (II) are blended with each other.

The step of preparing a resin composition is preferably a step of melt-kneading the aromatic polyetherketone resin (I) and the fluorine-containing copolymer (II) with a high shear force applied thereto. Specifically, the melt-kneading is preferably performed at a shear rate of 600 $sec^{-1}$ (/sec) or higher.

The shear rate is more preferably 700 $sec^{-1}$ (/sec) or higher, still more preferably 750 $sec^{-1}$ (/sec) or higher, particularly preferably 800 $sec^{-1}$ (/sec) or higher. This allows the fluorine-containing copolymer (II) to be dispersed in the submicron order in the aromatic polyetherketone resin (I) and can reduce the agglomerating behavior of the fluorine-containing copolymer (II) during molding. As a result, the resin composition obtained has much better fluidity and better thin-wall processibility, and can provide an insulating layer (B) having a high tensile elongation.

The shear rate (y) is a value determined using the following formula, for example.

$$\Gamma=\pi Dr/C$$

D: screw outer diameter (mm)

r: screw rotation speed (rps)

C: tip clearance (mm)

The melt-kneading is preferably performed with a high shear force applied to the aromatic polyetherketone resin and the fluorine-containing copolymer. The melt-kneading may be performed using any device and, under kneading conditions arranged for more effective application of shear force, such as the use of a special screw, a high rotation speed, and a narrow clearance, can be performed using any conventionally known device such as a twin-screw extruder, a single-screw extruder, a multi-screw extruder, a roll kneader such as a tandem extruder or a batch kneader, a Labo Plastomill, a Banbury mixer, a pressurizing kneader, or a blending mill. This allows the fluorine-containing copolymer to be dispersed in the submicron order in the aromatic polyetherketone resin and can reduce the agglomerating behavior of the fluorine-containing copolymer during molding. This results in an insulating layer (B) that does not suffer peeling of the surface and improves thin-wall processibility to provide an insulating layer (B) having a high tensile elongation. In order to apply a high shear force, the melt-kneading is preferably performed using a twin-screw extruder or a high shear processor (reflux high shear processor) including a kneading section provided with an internal return screw.

The internal return screw is a screw provided with a return hole along the central axis of the screw from the tip toward the back end. In a high shear processor including a kneading section provided with an internal return screw, a molten resin is charged into the kneading section and sent toward the tip along with the rotation of the internal return screw, flows into the return hole through an inlet on the tip to the back side and is ejected through an outlet, and is again sent toward the tip along with the rotation of the internal return screw, thereby completing circulation. This circulation can highly disperse and mix the molten resin and reduce the size of the dispersed phase. Examples of the high shear processor include devices disclosed in JP 2005-313608 A and JP 2011-046103 A.

In the case where a twin-screw extruder is used as a kneader, a twin-screw extruder having a large L/D screw structure is preferably used. The screw structure of the twin-screw extruder preferably has L/D=30 or higher, more preferably L/D=35 or higher, still more preferably L/D=40 or higher. The L/D means (effective screw length (L))/(screw diameter (D)). In order to improve the kneading performance and the productivity, the melt-kneading is most preferably performed using a twin-screw extruder.

The duration of the melt-kneading is preferably 1 to 600 sec, more preferably 5 to 300 sec. A melt-kneading duration longer than the above duration may cause significant degradation of the resin and may cause a failure in achieving the desired performance. A melt-kneading duration shorter than the above duration may cause poor dispersibility and may cause a failure in achieving the desired performance.

The temperature of the melt-kneading is not lower than the melting point of the aromatic polyetherketone resin as well as not lower than the melting point of the fluorine-containing copolymer (II), and is preferably 240° C. to 450° C., more preferably 260° C. to 400° C.

The insulating layer (B) may be formed by any method under any conventionally known conditions. Also, the insulating layer (B) may be formed directly on the conductor (A) or via another layer such as a different resin layer.

The insulating layer (B) can be formed by melt extruding the resin composition on the surface of the conductor (A) or on the surface of the different resin layer preliminarily formed on the conductor (A). Alternatively, the resin composition is first melt-extruded into a film, and the film was slit to a predetermined size and wound around the surface of the conductor (A) or the surface of the different resin layer preliminarily formed on the conductor (A) to form the insulating layer (B).

In the case of forming the insulating layer (B) by melt extrusion, the forming temperature is normally preferably a temperature equal to or higher than the melting point of the aromatic polyetherketone resin (I) used. The molding temperature is preferably lower than the lower temperature of the decomposition temperature of the fluorine-containing copolymer (II) and the decomposition temperature of the aromatic polyetherketone resin (I). Such a molding temperature may be, for example, 250° C. to 400° C. The molding temperature is preferably 320° C. to 400° C.

The insulated wire of the disclosure may be heated after formation of the insulating layer (B). The heating may be performed at a temperature near the melting point of the fluororesin.

The resin composition of the disclosure contains an aromatic polyetherketone resin (I) and a fluorine-containing copolymer (II). The resin composition has a melt viscosity at 60 $sec^{-1}$ and 390° C. of 0.40 to 0.75 kPa·s. The aromatic polyetherketone resin (I) has a melt viscosity at 60 $sec^{-1}$ and 390° C. of 0.30 kPa·s or lower.

The aromatic polyetherketone resin (I) having the above structure can form a layer excellent in processibility and tensile elongation.

The resin composition of the disclosure can be suitably used for an insulating layer in an insulated wire. Preferred embodiments of the insulating layer (B) in the insulated wire of the disclosure, and the aromatic polyetherketone resin (I) and the fluorine-containing copolymer (II) contained in the insulating layer (B) are all applicable to the resin composition of the disclosure.

The disclosure relates to an insulated wire including: a conductor (A); and an insulating layer (B) around the conductor (A); the insulating layer (B) containing an aromatic polyetherketone resin (I) and a fluorine-containing copolymer (II) and having a melt viscosity at 60 $sec^{-1}$ and 390° C. of 0.40 to 0.75 kPa·s, the aromatic polyetherketone resin (I) having a melt viscosity at 60 $sec^{-1}$ and 390° C. of 0.30 kPa·s or lower, the insulating layer (B) having a thickness of 30 to 300 μm (hereinafter, referred to as the "insulated wire of the disclosure").

The insulating layer (B) preferably has a ratio r2/r1 of 1.60 or lower, wherein r1 represents an average dispersed particle size of the fluorine-containing copolymer (II) and r2 represents an average dispersed particle size of the fluorine-containing copolymer (II) after melt flow rate measurement at 380° C. and a 5000-g load with 5-minute pre-heating in conformity with ASTM D1238.

The insulated wire of the disclosure preferably has a tensile elongation of 100% or higher.

The aromatic polyetherketone resin (I) preferably has a melting point of 300° C. to 380° C.

The aromatic polyetherketone resin (I) preferably has a glass transition temperature of 130° C. to 220° C.

The fluorine-containing copolymer (II) preferably has a melting point of 200° C. to 323° C.

The fluorine-containing copolymer (II) is preferably a copolymer of tetrafluoroethylene and a perfluoroethylenic unsaturated compound represented by the following formula (1):

$$CF_2{=}CF{-}Rf^1 \quad (1)$$

wherein $Rf^1$ is $-CF_3$ or $-ORf^2$; and $Rf^2$ is a C1-C5 perfluoroalkyl group.

The insulating layer (B) preferably has a ratio by mass (I):(II) of the aromatic polyetherketone resin (I) to the fluorine-containing copolymer (II) of 99:1 to 30:70.

The aromatic polyetherketone resin (I) is preferably polyetherketoneketone.

The disclosure also relates to a resin composition containing: an aromatic polyetherketone resin (I); and a fluorine-containing copolymer (II), the resin composition having a melt viscosity at 60 $sec^{-1}$ and 390° C. of 0.40 to 0.75 kPa·s, the aromatic polyetherketone resin (I) having a melt viscosity at 60 $sec^{-1}$ and 390° C. of 0.30 kPa·s or lower (hereinafter referred to as the "resin composition of the disclosure").

EXAMPLES

The disclosure is described with reference to, but not limited to, examples.

<Melt Flow Rate (MFR)>

(1) The MFR of the fluorine-containing copolymer is measured using a melt indexer at 380° C. and a 5000-g load in conformity with ASTM D1238.

(2) The MFR of the aromatic polyetherketone resin is measured using a melt indexer at 380° C. and a 5000-g load in conformity with ASTM D1238.

<Melt Viscosity>

The melt viscosities of the aromatic polyetherketone resin and the insulating layer were measured at 60 $sec^{-1}$ and 390° C. in conformity with ASTM D3835.

<Melting Point>

The melting point of the fluorine-containing copolymer was determined as the temperature corresponding to the maximum value on a heat-of-fusion curve with a temperature-increasing rate of 10° C./min using a differential scanning calorimeter (DSC).

The melting point of the aromatic polyetherketone resin was determined as the temperature corresponding to the maximum value on a heat-of-fusion curve with a temperature-increasing rate of 10° C./min using a differential scanning calorimeter (DSC).

<Glass Transition Temperature (Tg)>

The glass transition temperature (Tg) was measured using a differential scanning calorimeter (DSC).

<Moldability>

A 2-kV voltage was applied using a sparktester available from Zumbach Electronics AG in formation of the insulating layer (B) having a thickness of 80 μm by melt extrusion in test production of a wire, whereby the presence or absence of a sparktester error was determined. An error occurrence frequency of three or more times per 10,000 m was evaluated as failed, and an error occurrence frequency of less than three times per 10,000 m was evaluated as passed.

<Production of Injection-Molded Article>

The resin compositions produced in the examples and comparative examples were each dried at 120° C. for eight hours and injection-molded using a small injection molding machine, whereby a specimen in conformity with JIS K7161-2 was obtained.

<Relative Permittivity>

The aforementioned injection-molded article was cut using a waterjet available from Omax Corp. to provide a specimen (1.5×1.5×8.0 cm). The relative permittivity at 6 GHz of the cut-out specimen was measured by a cavity resonance perturbation method (using permittivity measurement device available from Kanto Electronics Application & Development Inc. and a network analyzer available from Agilent Technologies).

<Tensile Elongation>

The tensile elongation was measured using Autograph AGS-100NX available from Shimadzu Corporation. The conductor was pulled out from the electric wire preliminarily cut to 10 cm, and an obtained tube-shaped insulating layer was used as a specimen. A tensile test was performed at a tensile speed of 50 mm/s using the above tensile tester. The average elongation of the gauge length at break was determined in the test with n=5 under the conditions of the chuck-to-chuck distance of 27 mm and the initial gauge length of 25 mm.

<Crack Resistance Test>

The wire was cut to 15 cm and wound 10 times around a winding rod with the same diameter as the insulated wire at a speed not exceeding 1 turn/second. After winding, the wire was unwound at a speed not exceeding 1 turn/second. After the unwinding operation, the presence or absence of abnormalities such as peeling and cracking of the insulating layer was checked. Five samples were tested for each example. The example with two or more defective samples was rated failed, and the example with less than two defective samples was rated passed.

<Average Dispersed Particle Size>

The insulating layer formed was cut in the direction perpendicular to the longitudinal direction to obtain a measurement sample. The cross section of the measurement sample was observed using a confocal laser microscope. The resulting micrograph was analyzed using image analysis software (Image J). The dispersed phases were selected and the equivalent circle diameters were determined. The equivalent circle diameters for 20 dispersed phases were calculated and averaged to determine the average dispersed particle size.

<Ratio between Average Dispersed Particle Sizes>

Each of the kneaded mixtures (resin compositions) obtained in the examples was used to determine the average dispersed particle size r2 of the fluorine-containing copolymer (II) after melt flow rate measurement at 380° C. and a 5000-g load with 5-minute pre-heating in conformity with ASTM D1238. The ratio r2/r1 was then determined, wherein r1 represents the average dispersed particle size before the measurement.

In the examples and comparative examples, the following materials were used.

Aromatic polyetherketone resin (1): polyetherketoneketone (melt viscosity: 0.20 kPa·s, melting point: 332° C., Tg: 162° C.)

Aromatic polyetherketone resin (2): polyetheretherketone (melt viscosity: 0.26 kPa·s, melting point: 343° C., Tg: 149° C.)

Aromatic polyetherketone resin (3): polyetheretherketone (melt viscosity: 0.19 kPa·s, melting point: 343° C., Tg: 147° C.)

Aromatic polyetherketone resin (4): polyetherketoneketone (melt viscosity: 0.37 kPa·s, melting point: 356° C., Tg: 160° C.)

Aromatic polyetherketone resin (5): polyetheretherketone (melt viscosity: 0.17 kPa·s, melting point: 343° C., Tg: 150° C.)

Aromatic polyetherketone resin (6): polyetheretherketone (melt viscosity: 1.14 kPa s, melting point: 334° C., Tg: 143° C.)

Fluorine-containing copolymer (1): TFE/HFP/PPVE copolymer, MFR: 29.8 g/10 min, melting point: 255° C.

Fluorine-containing copolymer (2): TFE/HFP/PPVE copolymer, MFR: 12.3 g/10 min, melting point: 250° C. to 260° C.

Fluorine-containing copolymer (3): TFE/HFP copolymer, MFR: 6 g/10 min, melting point: 270° C.

Examples 1 to 7 and Comparative Examples 1 to 4

Any of the aromatic polyetherketone resins (1) to (6) and any of the fluorine-containing copolymers (1) to (3) were dry-blended in the ratio (% by mass) shown in Table 1 and dried at 120° C. for eight hours. The dried mixture was melt-kneaded using a reflux high shear processor available from Niigata Machine Techno Co., Ltd. under the following predetermined conditions, whereby a resin composition was obtained. The return hole used had a diameter of 2.5 mm.

Screw L/D: 1.8

Kneading temperature: 370° C.

Shear rate during kneading: 870 $sec^{-1}$

Kneading duration: 10 seconds

The single-screw extruder used to extrude the insulating layer had a cylinder diameter of 30 mm, L/D=22, a die inner diameter of 16 mm, and a tip outer diameter of 10.5 mm. The single-screw extruder was operated at a cylinder temperature of 370° C. to 395° C. and a screw rotation speed of 12 rpm. The resin composition obtained above was supplied from a hopper. Using a discharged molted resin composition, the insulating layer (B) having a thickness of 40 μm, 100 μm, 150 μm, or 300 μm was formed on the conductor (A) (diameter: 0.5 mm, cross-sectional area: 0.20 $mm^2$, single annealed copper wire), whereby an insulated wire was obtained. The line speed during this operation was 18 m/min.

Various evaluations were performed on the obtained insulated wires. Table 1 shows the results.

TABLE 1

| | Example 1 | Example 2 | Example 3 | Example 4 | Example 5 | Example 6 |
|---|---|---|---|---|---|---|
| Aromatic polyetherketone resin (1) (parts by mass) | 80 | 60 | 60 | 60 | 50 | |
| Aromatic polyetherketone resin (2) (parts by mass) | | | | | | 40 |
| Aromatic polyetherketone resin (3) (parts by mass) | | | | | | |
| Aromatic polyetherketone resin (4) (parts by mass) | | | | | | |
| Aromatic polyetherketone resin (5) (parts by mass) | | | | | | |
| Aromatic polyetherketone resin (6) (parts by mass) | | | | | | |
| Fluorine-containing copolymer (1) (parts by mass) | 20 | 40 | 40 | 40 | 50 | |
| Fluorine-containing copolymer (2) (parts by mass) | | | | | | 60 |
| Fluorine-containing copolymer (3) (parts by mass) | | | | | | |
| Melt viscosity of aromatic polyetherketone resin (kPa · s) | 0.20 | 0.20 | 0.20 | 0.20 | 0.20 | 0.28 |
| Melt viscosity of insulating layer (kPa · s) | 0.69 | 0.7 | 0.7 | 0.7 | 0.62 | 0.57 |
| Thickness of insulating layer (μm) | 100 | 40 | 150 | 300 | 150 | 100 |
| Average dispersed particle size ratio (r2/r1) | 1.24 | 1.28 | 1.3 | 1.47 | 1.54 | 1.56 |
| Moldability (sparktester (2 kV, film thickness: 80 μm) | Passed | Passed | Passed | Passed | Passed | Passed |
| Relative permittivity | 2.7 | 2.5 | 2.5 | 2.5 | 2.4 | 2.5 |
| Tensile elongation (%) | 212 | 228 | 194 | 152 | 172 | 156 |
| Crack resistance test | Passed | Passed | Passed | Passed | Passed | Passed |

| | Example 7 | Comparative Example 1 | Comparative Example 2 | Comparative Example 3 | Comparative Example 4 |
|---|---|---|---|---|---|
| Aromatic polyetherketone resin (1) (parts by mass) | | | | | |
| Aromatic polyetherketone resin (2) (parts by mass) | | | | | |
| Aromatic polyetherketone resin (3) (parts by mass) | 50 | | | | |
| Aromatic polyetherketone resin (4) (parts by mass) | | 80 | | | |
| Aromatic polyetherketone resin (5) (parts by mass) | | | | 60 | 80 |
| Aromatic polyetherketone resin (6) (parts by mass) | | | 50 | | |
| Fluorine-containing copolymer (1) (parts by mass) | | 20 | 50 | | |
| Fluorine-containing copolymer (2) (parts by mass) | 50 | | | | |
| Fluorine-containing copolymer (3) (parts by mass) | | | | 40 | 20 |
| Melt viscosity of aromatic polyetherketone resin (kPa · s) | 0.19 | 0.37 | 1.14 | 0.17 | 0.17 |
| Melt viscosity of insulating layer (kPa · s) | 0.52 | 0.46 | 0.65 | 0.95 | 0.8 |
| Thickness of insulating layer (μm) | 100 | 100 | 100 | 100 | 100 |
| Average dispersed particle size ratio (r2/r1) | 1.49 | 1.61 | —* | 1.46 | 1.36 |
| Moldability (sparktester (2 kV, film thickness: 80 μm) | Passed | Failed | Failed | Failed | Failed |
| Relative permittivity | 2.6 | 2.7 | 2.5 | 2.5 | 2.7 |
| Tensile elongation (%) | 167 | 86 | 13 | 56 | 92 |
| Crack resistance test | Passed | Failed | Failed | Passed | Passed |

What is claimed is:

1. An insulated wire comprising:

a conductor (A); and an insulating layer (B) around the conductor (A), the insulating layer (B) comprising an aromatic polyetherketone resin (I) and a fluorine-containing copolymer (II) and having a melt viscosity at 60 $sec^{-1}$ and 390° C. of 0.40 to 0.75 kPa·s, the aromatic polyetherketone resin (I) having a melt viscosity at 60 $sec^{-1}$ and 390° C. of 0.30 kPa's or lower, the insulating layer (B) having a thickness of 30 to 300 μm, the insulating layer (B) having a ratio by mass (I): (II) of the aromatic polyetherketone resin (I) to the fluorine-containing copolymer (II) of 80:20 to 40:60, the aromatic polyetherketone resin (I) is selected from the group consisting of a polyetherketoneketone (PEKK) and polyetheretherketone (PEEK), the fluorine-containing copolymer (II) is a copolymer of tetrafluoroethylene (TFE) and a perfluoroethylenic unsaturated compound represented by the following formula (1);

$$CF_2{=}CF{-}Rf^1 \quad (1)$$

wherein, in formula (1), $Rf^1$ is $-CF_3$ or $-ORf^2$; and $Rf^2$ is a C1-C5 perfluoroalkyl group.

2. The insulated wire according to claim 1, wherein the insulating layer (B) has a ratio r2/r1 of 1.60 or lower, wherein r1 represents an average dispersed particle size of the fluorine-containing copolymer (II) and r2 represents an average dispersed particle size of the fluorine-containing copolymer (II) after melt flow rate measurement at 380° C. and a 5000-g load with 5-minute pre-heating in conformity with ASTM D1238.

3. The insulated wire according to claim 1, wherein the insulated wire has a tensile elongation of 100% or higher.

4. The insulated wire according to claim 1, wherein the aromatic polyetherketone resin (I) has a melting point of 300° C. to 380° C.

5. The insulated wire according to claim 1, wherein the aromatic polyetherketone resin (I) has a glass transition temperature of 130° C. to 220° C.

6. The insulated wire according to claim 1, wherein the fluorine-containing copolymer (II) has a melting point of 200° C. to 323° C.

7. The insulated wire according to claim 1, wherein the aromatic polyetherketone resin (I) is polyetherketoneketone.

8. The insulated wire according to claim 1, wherein the perfluoroethylenic unsaturated compound is at least one selected from the group consisting of hexafluoropropylene (HFP), perfluoro (methyl vinyl ether) (PMVE), perfluoro (ethyl vinyl ether) (PEVE), and perfluoro (propyl vinyl ether) (PPVE).

9. The insulated wire according to claim 8, wherein the fluorine-containing copolymer (II) is at least one selected from the group consisting of a TFE/HFP/PPVE copolymer and a TFE/PPVE copolymer.

* * * * *